(12) United States Patent
Gómez Gutiérrez et al.

(10) Patent No.: US 10,647,424 B2
(45) Date of Patent: May 12, 2020

(54) HYBRID UNMANNED VEHICLES AND RELATED METHODS

(71) Applicant: Intel Corporation, Santa Clara, CA (US)

(72) Inventors: David Gómez Gutiérrez, Zapopan (MX); Leobardo Emmanuel Campos Macías, Guadalajara (MX); Rodrigo Aldana López, Zapopan (MX); Rafael De La Guardia González, Teuchitlan (MX); José Ignacio Parra Vilchis, Guadalajara (MX)

(73) Assignee: Intel Corporation, Santa Clara, CA (US)

( * ) Notice: Subject to any disclaimer, the term of this patent is extended or adjusted under 35 U.S.C. 154(b) by 408 days.

(21) Appl. No.: 15/716,192

(22) Filed: Sep. 26, 2017

(65) Prior Publication Data

US 2019/0092464 A1    Mar. 28, 2019

(51) Int. Cl.
*B64C 37/00*    (2006.01)
*B60F 5/02*    (2006.01)
(Continued)

(52) U.S. Cl.
CPC ............ *B64C 37/00* (2013.01); *B60F 5/02* (2013.01); *B62D 57/04* (2013.01); *B64C 39/024* (2013.01);
(Continued)

(58) Field of Classification Search
CPC . B64C 37/00; B64C 39/024; B64C 2201/108; B64C 2201/12; B60F 5/02; B62D 57/04
(Continued)

(56) References Cited

U.S. PATENT DOCUMENTS 7,653,464 B1    1/2010 Mitra
2014/0254896 A1*    9/2014 Zhou ..................... B25J 9/0006
                                                  382/124
(Continued)

FOREIGN PATENT DOCUMENTS

JP    2016199144    12/2016
KR    10-1610801    4/2016
WO    2017099554    6/2017

OTHER PUBLICATIONS

International Searching Authority, "International Search Report," issued in connection with International Patent Application No. PCT/US2018/047537, dated Nov. 29, 2018, 5 pages.
(Continued)

*Primary Examiner* — Christopher P Ellis
(74) *Attorney, Agent, or Firm* — Hanley, Flight & Zimmerman, LLC

(57) ABSTRACT

Hybrid unmanned vehicles are disclosed. An example vehicle includes a housing and a rollerball rotatably coupled to the housing and a propulsion system supported by the housing. The propulsion system is to generate lift to enable the vehicle to navigate in a first mode of operation. The vehicle includes a rollerball rotatably coupled to the housing. The rollerball to enable the housing to navigate in a second mode of operation different than the first mode of operation. The propulsion system is to generate a drive force to enable the vehicle to navigate in the second mode of operation via the rollerball.

20 Claims, 9 Drawing Sheets

(51) Int. Cl.
*B64C 39/02* (2006.01)
*B64D 1/18* (2006.01)
*B62D 57/04* (2006.01)
*B64F 5/10* (2017.01)

(52) U.S. Cl.
CPC ............... *B64D 1/18* (2013.01); *B64F 5/10* (2017.01); *B64C 2201/108* (2013.01); *B64C 2201/12* (2013.01)

(58) Field of Classification Search
USPC .......................................................... 244/2
See application file for complete search history.

(56) References Cited

U.S. PATENT DOCUMENTS

| | | | |
|---|---|---|---|
| 2015/0028155 A1* | 1/2015 | Reiter | B64C 27/16 244/39 |
| 2016/0144982 A1* | 5/2016 | Sugumaran | B64C 25/32 244/103 R |
| 2016/0368604 A1 | 12/2016 | Duesterhoft et al. | |
| 2019/0047691 A1* | 2/2019 | Schank | B64C 29/0033 |
| 2019/0257290 A1* | 8/2019 | Sia | B64C 39/022 |
| 2019/0276145 A1* | 9/2019 | McCullough | B64C 29/0033 |

OTHER PUBLICATIONS

International Searching Authority, "Written Opinion," issued in connection with International Patent Application No. PCT/US2018/047537, dated Nov. 29, 2018, 12 pages.

\* cited by examiner

HYBRID UNMANNED VEHICLES AND RELATED METHODS

FIELD OF THE DISCLOSURE

This disclosure relates generally to unmanned vehicles, and, more particularly, to hybrid unmanned vehicles and related methods.

BACKGROUND

Over the years, unmanned vehicles or drones have become increasingly sophisticated. For example, some unmanned vehicles are hybrid vehicles that can perform both aerial and land missions.

Figure 1:
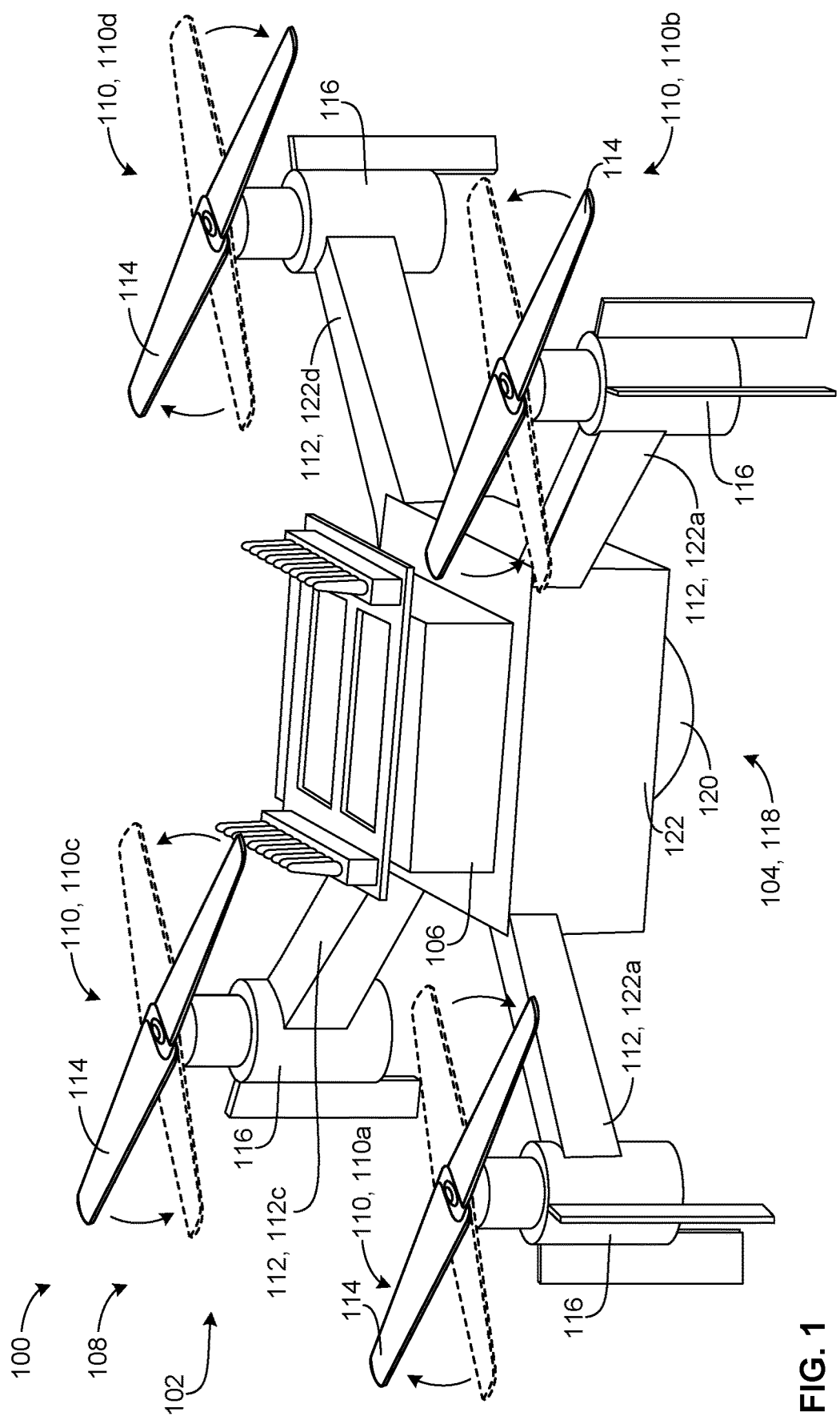
FIG. 1 is a top perspective view of an example unmanned vehicle constructed in accordance with the teachings of this disclosure.

The figures are not to scale. Instead, to clarify multiple layers and regions, the thickness of the layers may be enlarged in the drawings. Wherever possible, the same reference numbers will be used throughout the drawing(s) and accompanying written description to refer to the same or like parts. As used in this patent, stating that any part (e.g., a layer, film, area, or plate) is in any way positioned on (e.g., positioned on, located on, disposed on, or formed on, etc.) another part, indicates that the referenced part is either in contact with the other part, or that the referenced part is above the other part with one or more intermediate part(s) located therebetween. Stating that any part is in contact with another part means that there is no intermediate part between the two parts. Stating that a part is coupled or connected to another part indicates that the parts are jointed directly or through one or more intervening parts. Thus, physical contact is not required for two parts to be coupled or connected.

DETAILED DESCRIPTION

For purposes of explanation, examples disclosed herein are described with respect to unmanned vehicles (e.g., drones). However, the teachings disclosed herein may be suitably adapted to other types of vehicles (e.g. rovers) or other machines (e.g. robots) that may be autonomously moved using multiple motors.

Hybrid unmanned vehicles capable of both airborne and terrestrial locomotion provide various advantages. For example, hybrid unmanned vehicles typically consume less power when navigating on the ground, thereby extending a range (e.g., a battery life) of the unmanned vehicles. In some examples, autonomous unmanned vehicles may extend battery life by navigating on the ground during a first portion of a trajectory path and navigating in air during a second portion of a trajectory path. In some instances, a payload can be moved more efficiently on the ground than in the air. In some examples such as search and rescue (e.g., inside collapsed buildings), hybrid unmanned vehicles can navigate on the ground to move through tunnels and/or under piles of rubble, and navigate in the air to move up and down stairs, through windows and/or across gaps in the floor.

Known hybrid unmanned vehicles typically include a combination of a wheel platform (e.g., a wheel supported by an axle) and a multi-rotor platform. Such known hybrid unmanned vehicles are typically excessively heavy because such known hybrid unmanned vehicles employ dedicated drive systems for each mode of operation. For example, such known hybrid unmanned vehicles typically include a propulsion system to generate lift when operating the hybrid unmanned vehicles in an aerial mode of operation and a drive system to generate motive power when operating the hybrid unmanned vehicle in a ground mode of operation.

Additionally, such hybrid unmanned vehicles having multiple drive systems often require different trajectory planning and/or control solutions for controlling each of the drive systems (e.g., the propulsion system during air navigation and the drive system for ground navigation). For example, wheeled platforms may be overly constrained in movement and lack maneuverability on the ground compared to airborne multi-rotor platforms. For example, wheel platforms can travel along straight-line trajectories and/or along arcs of bounded curvature when moving in a horizontal plane. Thus, such wheel platforms cannot move sideways. On the contrary, multi-rotor platforms have no such constraints when navigating in the air along a horizontal plane. Therefore, planning and following trajectories for wheeled platforms require a different set of algorithms than for the multi-rotor platforms, consequently increasing hardware and software requirements for the hybrid unmanned vehicles. As noted above, hybrid unmanned vehicles that require a dedicated drive system (e.g., motor(s)) to operate the wheeled platform and a dedicated propulsion system (e.g., motors and rotors) to operate the multi-rotor platform significantly increase manufacturing costs and/or a dimensional footprint (e.g., size and weight) of the unmanned vehicle.

Example hybrid unmanned vehicles disclosed herein are capable of both aerial and terrestrial locomotion. For example, the hybrid unmanned vehicles disclosed herein operate in a first mode of operation and a second mode of operation different than the first mode of operation (e.g., dual modes of operation). In the first mode of operation, example unmanned vehicles disclosed herein operate in an aerial mode of operation (e.g., fly in the air). In the second mode of operation, example unmanned vehicles disclosed herein operate in ground mode of operation (e.g., roll across a terrain). Specifically, example hybrid unmanned vehicles disclosed herein enable operation in the first mode of operation and the second mode of operation based on a single or common drive system (e.g., a propulsion system of the unmanned vehicle).

For example, to enable aerial operation in the first mode of operation, example unmanned vehicles disclosed herein employ a multi-rotor platform. To generate lift and/or maneuver example unmanned vehicles disclosed herein in the first configuration, the propulsion system employs a propulsion system (e.g., one or more rotors). To enable ground operation in the second mode of operation, example unmanned vehicles disclosed here employ a rollerball platform (e.g., a uni-ball, track ball, a sphere, etc.). Specifically, the rollerball platform of the illustrated example freewheels to operate the example unmanned vehicles disclosed herein in the second mode of operation. Thus, thrust or force generated by the propulsions system causes an unmanned vehicle disclosed herein to move during terrestrial operations. In other words, the unmanned vehicle of the illustrated example is driven by the propulsion system during the first mode of operation and the second mode of operation.

To enable use of the same propulsion system for both the first mode of operation and the second mode of operation, example rollerball platforms disclosed herein enable similar (e.g., identical) motion in the second mode of operation (e.g., rolling on the ground) as the multi-rotor platform enables in the first mode of operation (e.g., flying in the air). For example, example unmanned vehicles disclosed herein can maneuver or rotate in yaw, pitch and roll angular directions for moving in any direction when operating in both the first mode of operation and the second mode of operation. The rollerball platforms disclosed herein roll or rotate freely (e.g., in any rotational direction) with respect to a housing of the unmanned vehicle. Thus, the rollerball platform disclosed herein are not powered directly, and freely rotates (e.g., spins) due the rotor thrust generated by the propulsion system. In other words, example roller systems disclosed herein do not constrain movement of the unmanned vehicle in straight line trajectories and/or along arcs of bounded curvature when moving in a horizontal plane. Thus, roller ball platforms disclosed herein enable the unmanned vehicle to move sideways when the unmanned vehicle is in the second mode of operation (e.g., ground mode). Thus, the hybrid unmanned vehicles disclosed herein operate in the first mode of operation and the second mode of operation with the same motors, algorithms, trajectory planning and/or controls. In other words, example hybrid unmanned vehicles operate in dual modes of operation without the need for additional motors, different algorithms, drivers and/or controls.

Example unmanned vehicles disclosed herein may employ the rollerball platform to apply special markings on the ground when operating in the second mode of operation. The markings can be visible from air and/or may be sensed by other unmanned vehicles to communicate information. In some examples, the markings disappear after a duration. For example, the markings can be used to indicate a region has been visited when engaged in an exploration task, landmarks for relocalization and loop closure for localization and mapping, calibration of visual odometry and localization sensors as they can be applied at precise regular intervals, etc.

FIG. 1 is top, perspective views of an example unmanned vehicle 100 constructed in accordance with the teachings of this disclosure. The unmanned vehicle 100 of the illustrated example is a hybrid vehicle that has dual modes of operation capable of aerial and terrestrial locomotion. The unmanned vehicle 100 of the illustrated example operates in a first mode of operation (e.g., an aerial mode) or a second mode of operation (e.g., a land mode) different than the first mode of operation. To enable aerial locomotion, the unmanned vehicle 100 of the illustrated includes a multi-rotor platform 102. To enable terrestrial locomotion, the unmanned vehicle 100 of the illustrated example includes a rollerball platform 104. To support the multi-rotor platform 102 and the rollerball platform 104, the unmanned vehicle 100 of the illustrated example includes a housing 106 (e.g., a body or a housing providing a frame for supporting components of the unmanned vehicle 100).

To generate lift and/or to maneuver the unmanned vehicle 100, the unmanned vehicle 100 of the illustrated example includes a propulsion system 108. The propulsion system 108 of the unmanned vehicle 100 of the illustrated example includes one or more rotor assemblies 110. To support the rotor assemblies 110, the unmanned vehicle 100 of the illustrated example includes one or more example arms 112 coupled to the housing. The unmanned vehicle 100 of the illustrated example includes four rotor assemblies 110a-d. As such, it may be referred to as a quad-copter. Thus, the housing 106 of the illustrated example includes a first arm 112a, a second arm 112b, a third arm 112c and a fourth arm 112d to support the respective ones of the rotor assemblies 110a-d. For example, the housing 106 of the illustrated example has an X-shaped profile. However, other bodies and/or rotor configurations may alternatively be used such as, for example, a helicopter configuration (e.g., one horizontal rotor and one vertical rotor), a fixed wing configuration, etc. Moreover, the unmanned vehicle 100 may include less than, or more than, four arms 112 and/or rotor assemblies 110. Each of the rotor assemblies 110 of the illustrated example includes a rotor or propeller 114 (e.g., a blade) that is driven by a motor 116 (e.g., an electric motor such as a direct current (DC) motor). The motor 116 rotates the propeller 114 to generate lift and/or maneuver the unmanned vehicle 100. Thus, the propellers 114 provides means for providing lift to the housing 106.

To drive the unmanned vehicle 100 in the second mode of operation via the rollerball platform 104, the unmanned vehicle 100 of the illustrated example employs the propulsion system 108. Thus, the propulsion system 108 of the illustrated example operates the unmanned vehicle 100 in the first mode of operation and the second mode of operation. Additionally, the rollerball platform 104 of the illustrated example provides a landing gear. In some examples, the rollerball platform 104 provides means for landing the unmanned vehicle 100. The rollerball platform 104 of the illustrated example includes a rollerball assembly 118 having a ball 120 and a carrier or carriage 122 (e.g., a frame or housing). The ball 120 of the of the illustrated example at least partially projects from the carriage 122. The rollerball assembly 118 of the illustrated example is coupled or formed with the unmanned vehicle 100. However, in some examples, the rollerball assembly 118 of the illustrated example may retrofit existing unmanned vehicles.

Figure 2:
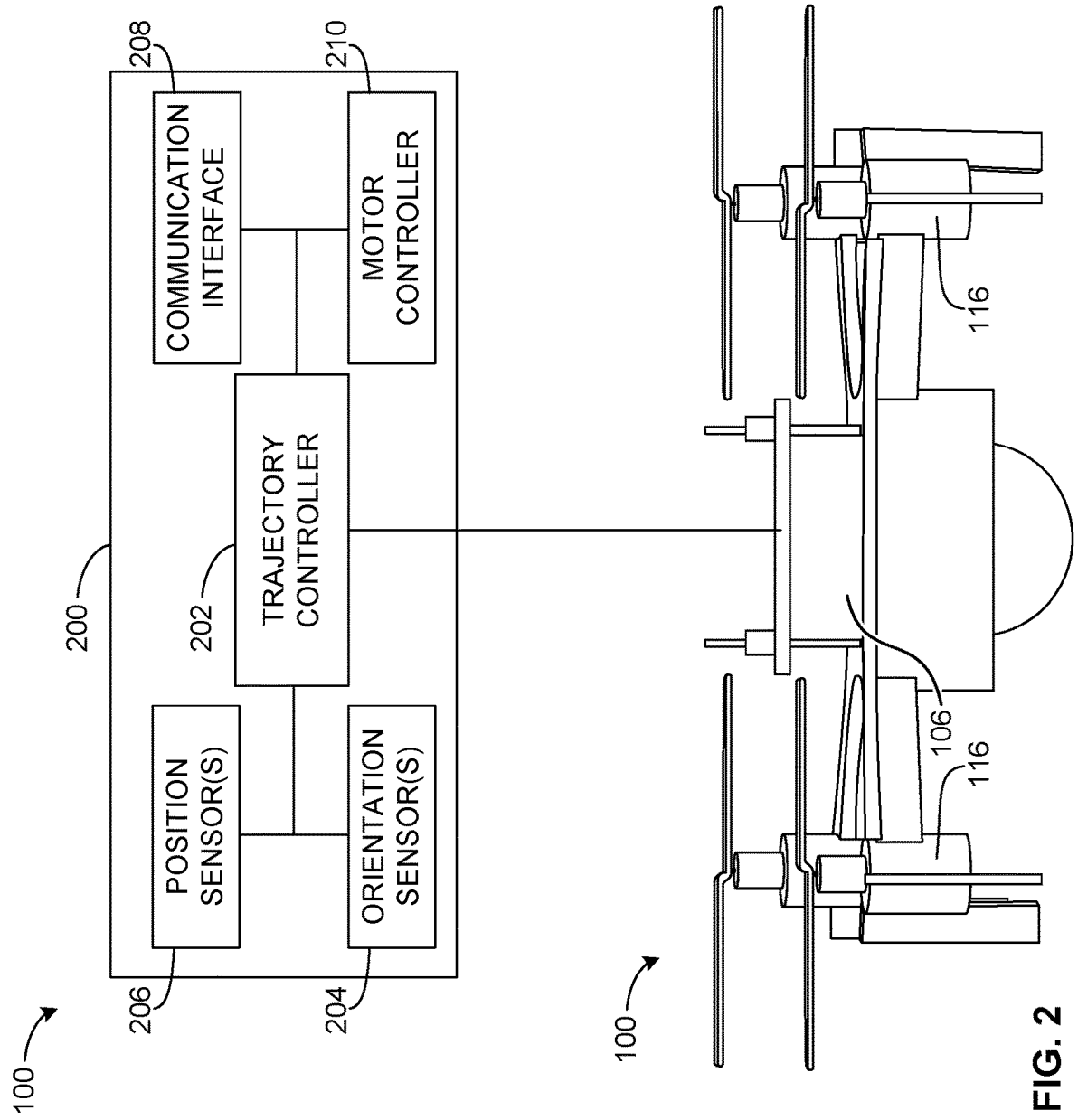
FIG. 2 is a front, perspective view of the example unmanned vehicle of FIG. 1.

FIG. 2 is a schematic illustrating an example unmanned vehicle 100 constructed in accordance with the teachings disclosed herein. To maneuver or control the unmanned vehicle 100, the unmanned vehicle 100 of the illustrated example includes a control system 200. The control system 200 of the illustrated example may be implemented with an electrical device(s) and/or component(s) (e.g., high computing power systems electronic device(s) or component(s), a system on a chip (SoC), a microprocessor, etc.). The housing 106 of the illustrated example contains or encloses electrical component(s) that enable operation of the unmanned vehicle 100.

The control system 200 of the unmanned vehicle 100 of the illustrated example includes a trajectory controller 202 capable of (e.g., autonomously) controlling movement of the unmanned vehicle 100 in both the first mode of operation (e.g., aerial mode) and the second mode of operation (e.g., terrestrial mode). Thus, the electrical device(s) or component(s) of the control system 200 of the illustrated example that are used to control the unmanned vehicle 100 of the illustrated during aerial locomotion also control the unmanned vehicle 100 of the illustrated example during terrestrial locomotion.

Figure 3:
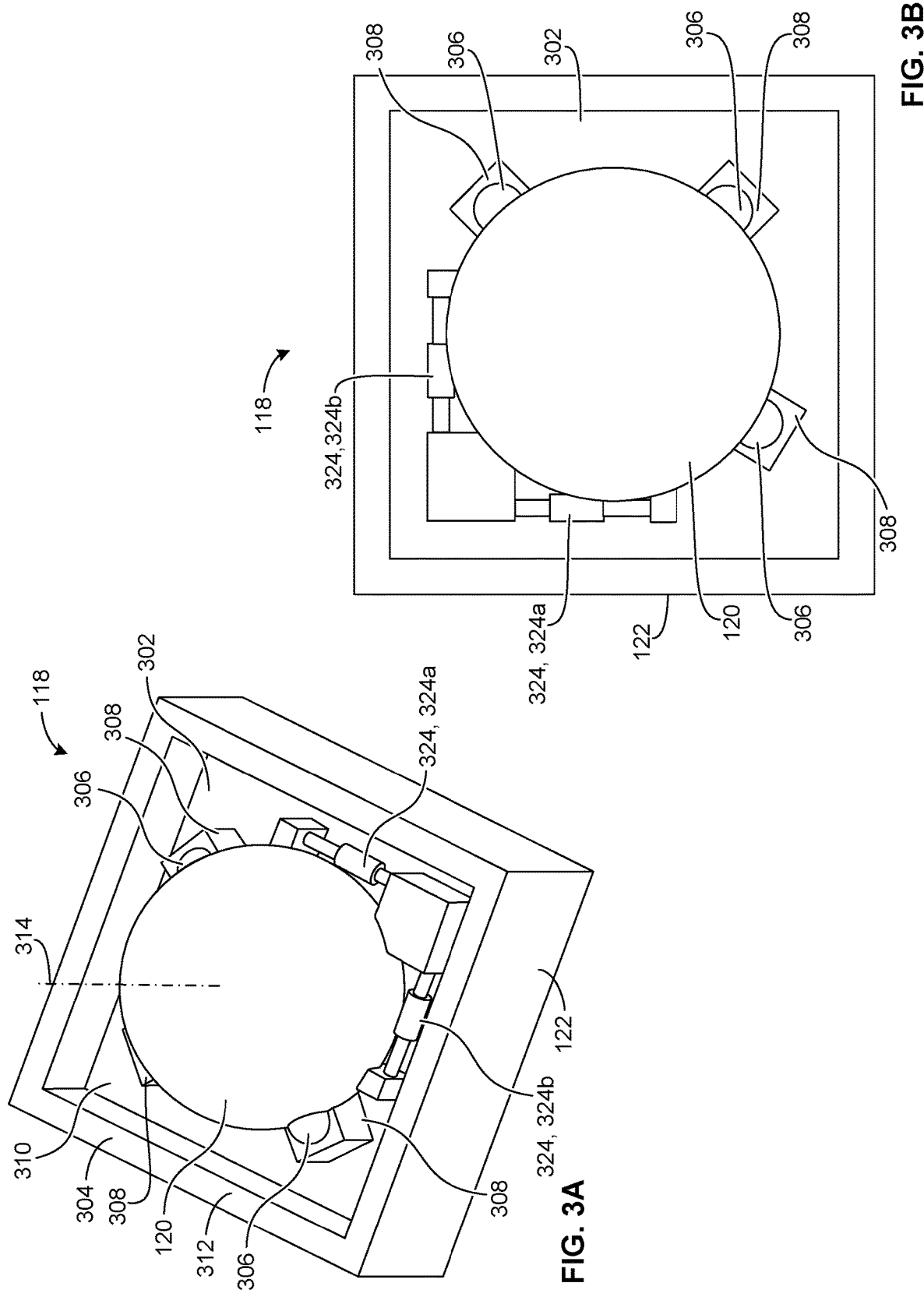
FIG. 3A is a partially assembled view of an example housing of the example unmanned vehicle of FIGS. 1 and 2.
FIG. 3B is a front view of the example housing of FIG. 3A.

The trajectory controller 202 of the illustrated example generates control inputs provided to the motors 116 that are used to move the unmanned vehicle 100 (e.g., by driving the propellers 114). The unmanned vehicle 100 of the illustrated example is provided with one or more orientation sensor(s) 204 to provide information indicative of the attitude or orientation of the unmanned vehicle 100 to the example trajectory controller 202. In some examples, the orientation sensor(s) 204 include accelerometers, gyroscopes, magnetic field sensors, etc. that are associated with an inertial measurement unit (IMU). To provide information indicative of the position or location of the unmanned vehicle 100, the example control system 200 of the illustrated example includes one or more position sensor(s) 206. The position sensor(s) 206 may include image sensors, a global position system (GPS), encoders 324 (FIGS. 3A and 3B), etc.

The control system 200 of the illustrated example is provided with a communication interface 208 to enable communications with a remote operator. In some examples, control provided by the trajectory controller 202 is partially autonomous in that control is accomplished based on inputs from a remote operator as well as substantially real-time feedback from the orientation sensor(s) 204 and the position sensor(s) 206. For example, the trajectory controller 202 may provide attitude control while a remote operator controls translational movement of the unmanned vehicle 100. Attitude control refers to the control or stabilization of the orientation of the unmanned vehicle 100 (e.g., about a first axis (e.g., yaw angle), a second axis (e.g., pitch angle) and a third axis (e.g., roll angle).

In some examples, control provided by the trajectory controller 202 is fully autonomous based on input data generated via the orientation sensor(s) 204 and the position sensor(s) 206. In some examples, the trajectory controller 202 is sufficient to provide autonomous attitude control as well as trajectory tracking and/or planning. Trajectory tracking refers to the control of the movement of the unmanned vehicle 100 (e.g., within three-dimensional space and/or two-dimensional space) to follow a trajectory path (e.g., a designated flightpath) and/or arrive at a designated destination. In some such examples, the communication interface 208 is provided to enable an operator to initially define the trajectory path and/or destination and/or to otherwise configure or control parameters used in the control algorithms for trajectory tracking and/or trajectory planning once the unmanned vehicle 100 takes flight and/or moves on the ground. In other words, as noted above, the trajectory controller 202 maybe employed to control aerial and terrestrial locomotion of the unmanned vehicle 100 (e.g., when the unmanned vehicle 100 takes flight and when the unmanned vehicle 100 rovers on the ground).

The trajectory controller 202 of the illustrated example may plan a trajectory of the unmanned vehicle 100 based on received command inputs. In some examples, the control system 200 may be based on a mathematical model defining movement of the unmanned vehicle 100. For example, the mathematical model may determine outputs required from each motor 116 to move the unmanned vehicle 100 along a determined trajectory. For example, to enable control of the unmanned vehicle 100, the model may include multiple controllable variables that may be defined by control inputs that control the motors 116. Example control inputs that control the motors 116 include motor torque, angular velocity, and/or a combination of associated inputs that control the motors 116 of the unmanned vehicle 100. In the illustrated example, there are four control inputs corresponding to four motors of a quadcopter (e.g., a four-motor unmanned vehicle). Different systems corresponding to different types of unmanned vehicles may include different types and/or different numbers of control inputs.

Based on the values of the control inputs, the trajectory controller 202 of the illustrated example via, for example a model employed by the trajectory controller 202, produces corresponding outputs used to control the unmanned vehicle 100 by, for example, adjusting the control inputs (e.g., torque and/or associated speed (e.g., angular velocity)) of each of the motors 116. Any adjustments to the outputs, as well as external disturbances, may affect the states (e.g., position, speed, acceleration, orientation, angular rotation, etc.) of the unmanned vehicle 100, thereby giving rise to the need to adjust the control inputs.

In some examples, to stabilize and/or change the behavior (e.g., movement) of the unmanned vehicle 100, the trajectory controller 202 of the illustrated example employs a control law to calculate the control inputs. The control law corresponds to mathematical expressions or relationships for the control variables in the model that are derived as a function of the unmanned vehicle states. Thus, the control law may be used to generate updated control inputs (e.g., angular velocities) that may be iteratively analyzed in accordance with the model to continuously update the outputs and resulting states of the unmanned vehicle 100. Thus, the trajectory controller 202 of the illustrated example employs a model or trajectory planner that determines the angular velocity for each of the motors 116 needed to move the unmanned vehicle 100 along an estimated trajectory path when the unmanned vehicle 100 of the illustrated example is in the first mode of operation (e.g., in flight) or the second mode of operation (e.g., roving on the ground).

FIG. 3A is a bottom, partially assembled perspective view of the example rollerball assembly 118 of FIGS. 1 and 2. FIG. 3A is a front view of the example rollerball assembly 118 of FIG. 3A. The ball 120 of the illustrated example is rotatably coupled or positioned in the carriage 122. More specifically, the ball 120 of the illustrated example is positioned in a cavity 302 (e.g., a recessed cavity) formed by a wall 304 of the carriage 122 formed about a perimeter of the carriage 122. The ball 120 of the illustrated example rotates freely relative to the carriage 122. The ball 120 of the illustrated example is a sphere.

The ball 120 of the illustrated example supports a weight of the unmanned vehicle 100 and/or provides a landing gear of the unmanned vehicle 100 without deforming (e.g. plastically deforming). In other words, the ball 120 of the illustrated example maintains its shape and/or form (e.g., maintains a spherical shape or form) when the ball 120 is positioned on a terrestrial surface (e.g., a solid surface) and supports the (e.g., the entire) weight of the unmanned vehicle 100. The ball 120 of the illustrated example may be composed of a plastic material, a rubber material, a metallic material and/or any other suitable material(s) that provides low rolling friction, supports the weight of the unmanned vehicle 100, and/or supports a landing phase of the unmanned vehicle 100 without deforming.

To enable and/or support rotational motion of the ball 120 relative to the carriage 122, the rollerball assembly 188 of the illustrated example includes one or more bearings 306. The bearings 306 of the illustrated example are ball bearings. However, in some examples, the bearings 306 may be cylindrical bearings and/or any other bearing or structure that supports rotation of the ball 120 relative to the carriage 122. To maintain a position of the bearings 306 relative to the ball 120 and/or the carriage 122, the carriage 122 of the illustrated example includes one or more retainers 308. The retainers 308 of the illustrated example protrude from a surface 310 (e.g., a bottom surface) of the carriage 122 in a direction toward a surface 312 (e.g., an upper surface) of the wall 304 of the carriage 122. The retainers 308 of the illustrated example are radially spaced relative to a longitudinal axis 314 of the carriage 122. A respective one of the retainers 308 maintain the respective ones of the bearings 306 engaged (e.g., in direct contact) with the ball 120. The retainers 308 of the illustrated example are integrally formed with the carriage 122 as a unitary structure. However, in some examples, the retainers 308 may be coupled to the surface 310 of the carriage 122 via a fastener (e.g., a screw, a bracket, etc.). The bearings 306 of the illustrated example enable the ball 120 to rotate and/or spin freely relative to the carriage 122 with relatively low rolling friction (e.g., minimal or negligible friction).

To track the movement of the unmanned vehicle 100 (e.g., in an x-axis direction and a y-axis direction) based on a rotation of the ball 120 relative to the carriage 122 when the unmanned vehicle 100 is in the second mode of operation (e.g., ground mode), the rollerball assembly 118 of the illustrated example includes one or more encoders 324. The rollerball assembly 118 of the illustrated example includes a first encoder 324a and the second encoder 324b. The encoders 324 of the illustrated example are journaled for rotation relative to the carriage 122 and/or the ball 120. More specifically, the ball 120 of the illustrated example engages (e.g., is in direct contact with) the first encoder 324a and the second encoder 324b. Therefore, the ball 120 of the illustrated example causes the first encoder 324a and/or the second encoder 324b to rotate when the ball 120 rotates or spins relative to the carriage 122. In this manner, the first encoder 324a tracks a distance that the unmanned vehicle 100 moves in a first direction (e.g., the x-axis direction) as the ball 120 causes rotation of the first encoder 324a and the second encoder 324b tracks a distance that the unmanned vehicle 100 moves in a second direction (e.g., a y-axis direction) as the ball 120 causes rotation of the second encoder 324b when the unmanned vehicle 100 of the illustrated example is in the second mode of operation (e.g., moving on the ground). The first and second encoders 324a-b of the illustrated example are communicatively coupled to the control system 200 of FIG. 2. For example, output signals from the first encoder 324a and the second encoder 324b may be combined with other onboard sensors (e.g., the orientation sensors 204, the position sensors 206, accelerometers and/or optical flow meters) to improve tracking accuracy of the unmanned vehicle 100 an/or provide redundancy. In some examples, (e.g., due the orientation sensors 204 and the position sensors 206 of FIG. 2), the encoders 324 may not be included with the rollerball assembly 118 and/or may not be communicatively coupled to the control system 200. In some examples, the encoders 324 may be replaced with cylindrical bearings and/or other bearings and/or retainers.

Figure 4:
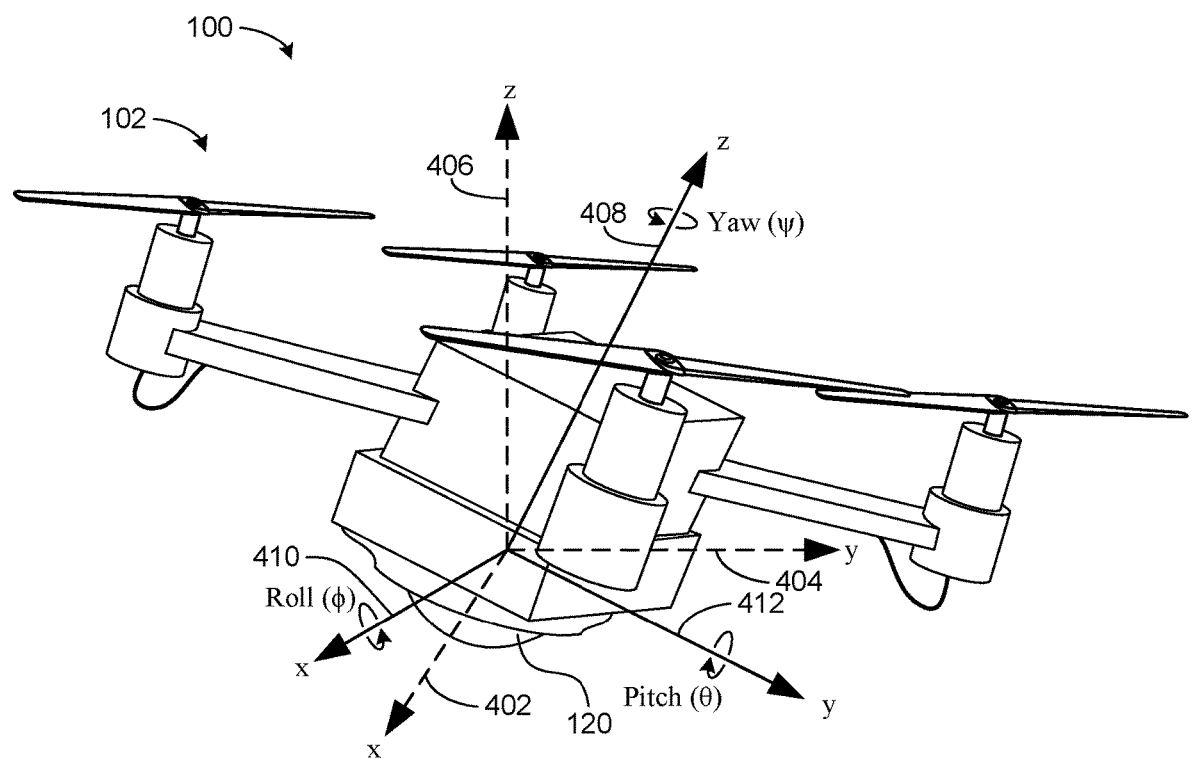
FIG. 4 is a perspective view of the example unmanned vehicle of FIGS. 1 and 2.

FIG. 4 is a perspective view of the unmanned vehicle 100 of FIGS. 1 and 2. In the first mode of operation, the control system 200 navigates the unmanned vehicle 100 in aerial locomotion via the propulsion system 108. The multi-rotor platform 102 of the illustrated example enables three degrees of freedom in translational motion about an x-direction 402, a y-direction 404 and a z-direction 406, and three degrees of freedom in rotational motion about a yaw direction 408 (e.g., a yaw angle (ψ)), a roll direction 410 (e.g., a roll angle (φ)), and a pitch direction 412 (e.g., a pitch angle (θ)) when navigating the unmanned vehicle 100 in the first mode of operation. The propulsion system 108 generates lift that is greater than the weight of the unmanned vehicle 100 to move the unmanned vehicle 100 vertically in the z-direction.

In the second mode of operation, the unmanned vehicle 100 of the illustrated example employs the propulsion system 108 and the rollerball assembly 118 to navigate the unmanned vehicle 100 during terrestrial locomotion. Specifically, when navigating the unmanned vehicle 100 in the second mode of operation, the rollerball assembly 118 of the illustrated example enables two degrees of freedom of translational motion in the x-direction 402 and the y-direction 404, and three degrees of freedom of rotational motion about the yaw direction 408, the roll direction 410, and the pitch direction 412. Thus, the rollerball assembly 118 of the illustrated example enables movement of the unmanned vehicle 100 in any direction except vertically along the z-direction 406. In the second mode of operation, the propulsion system 108 generates lift in the z-direction that is less than the weight of the unmanned vehicle 100. Changing a direction orientation of the unmanned vehicle 100 about the yaw direction 408 changes a direction of the unmanned vehicle 100.

During operation, rotational movement of the ball 120 relative to the carriage 122 is translated into a distance and direction in the x-direction 402 and a distance and direction along the y-direction 404. Specifically, the ball 120 spins or rotates relative to the carriage 122 in any direction to enable the unmanned vehicle 100 of the illustrated example to maneuver in a forward and rearward direction, a side to side (e.g., sideways), and/or a rotational direction about the yaw direction 408. Thus, the unmanned vehicle 100 can maneuver in any direction in a plane defined by the x-direction 402 and the y-direction 404 (e.g., the x-y plane). Thus, the unmanned vehicle 100 of the illustrated example can maneuver in the same directions when operating in the first mode of operation and the second mode of operation, except in a z-direction (e.g., a vertical direction). Thus, when maneuvering in the second mode of operation, the unmanned vehicle 100 of the illustrated example is only constrained in the z-axis direction (e.g., a vertical direction). In this manner, unlike conventional wheeled vehicles, the rollerball platform 104 provided by the rollerball assembly 118 of illustrated example does not constrain movement of the unmanned vehicle 100 (e.g., in the xy-plane) to straight line trajectories or bound curved trajectories.

Additionally, a relatively low rolling friction characteristic(s) of the ball 120 enables acceleration capabilities of the unmanned vehicle 100 in the x-direction 402 and the y-direction 404 when operating in the second mode of operation to be comparable to acceleration capabilities of the unmanned vehicle 100 when operating in the first mode of operation.

Further, as mentioned above, enabling movement of the unmanned vehicle 100 of the illustrated in any direction when in the second mode of operation enables the control system 200 of the illustrated example to control the unmanned vehicle 100 with similar (e.g., identical) set of algorithms that the control system 200 employs to operate the unmanned vehicle 100 in the first mode of operation. As a result, enabling the same planar motion capabilities (e.g., translation in the x-direction 402, the y-direction 404, and the yaw direction 408 (e.g., the yaw rotational angle)) when operating in the first mode of operation or the second mode of operation enables use of the propulsion system 108 and the control system 200 (e.g., the motors, drivers, controls and/or algorithms) for trajectory planning and/or trajectory tracking. In this manner, the rollerball assembly 118 is the only additional hardware required to provide a hybrid unmanned vehicle having dual modes of operation. As a result, manufacturing costs and/or complexity of the unmanned vehicle 100 of the illustrated example is significantly lower compared to other known hybrid unmanned vehicles.

Additionally, operating the unmanned vehicle 100 of the illustrated example in the second mode of operation significantly reduces power consumption of a power source (e.g., a rechargeable battery), thereby conserving energy and significantly increasing an operating duration and/or range of the unmanned vehicle 100 (e.g., enabling the unmanned vehicle 100 to travel farther distances without recharging the battery). For example, less power consumption is needed in the second mode of operation compared to the first mode of operation because a total thrust generated to drive the unmanned vehicle 100 during terrestrial locomotion is less than a total thrust generated to fly the unmanned vehicle 100 during aerial locomotion. For example, a total thrust produced by the unmanned vehicle 100 when operating in the first mode of operation must be greater than or equal to the weight of the platform and a total thrust produced by the unmanned vehicle 100 when operating in the second mode of operation must overcome ground friction, which is much lower compared to the weight of the unmanned vehicle 100. Therefore, less energy consumption is needed during terrestrial locomotion than aerial locomotion. In some examples, operating the unmanned vehicle 100 in the second mode of operation can reduce the power consumption by half. Therefore, rolling on the ground is much more efficient than flying, which can increase operating time and range of the unmanned vehicle 100 compared to an aerial-only system.

Additionally, in some examples, the unmanned vehicle 100 of the illustrated example may carry (e.g., pull) objects in the second mode of operation that the unmanned vehicle 100 may not be able to carry in the first mode of operation. For example, loads that may be too heavy to be airlifted via aerial locomotion may be carried on the ground via terrestrial locomotion.

Figure 5:
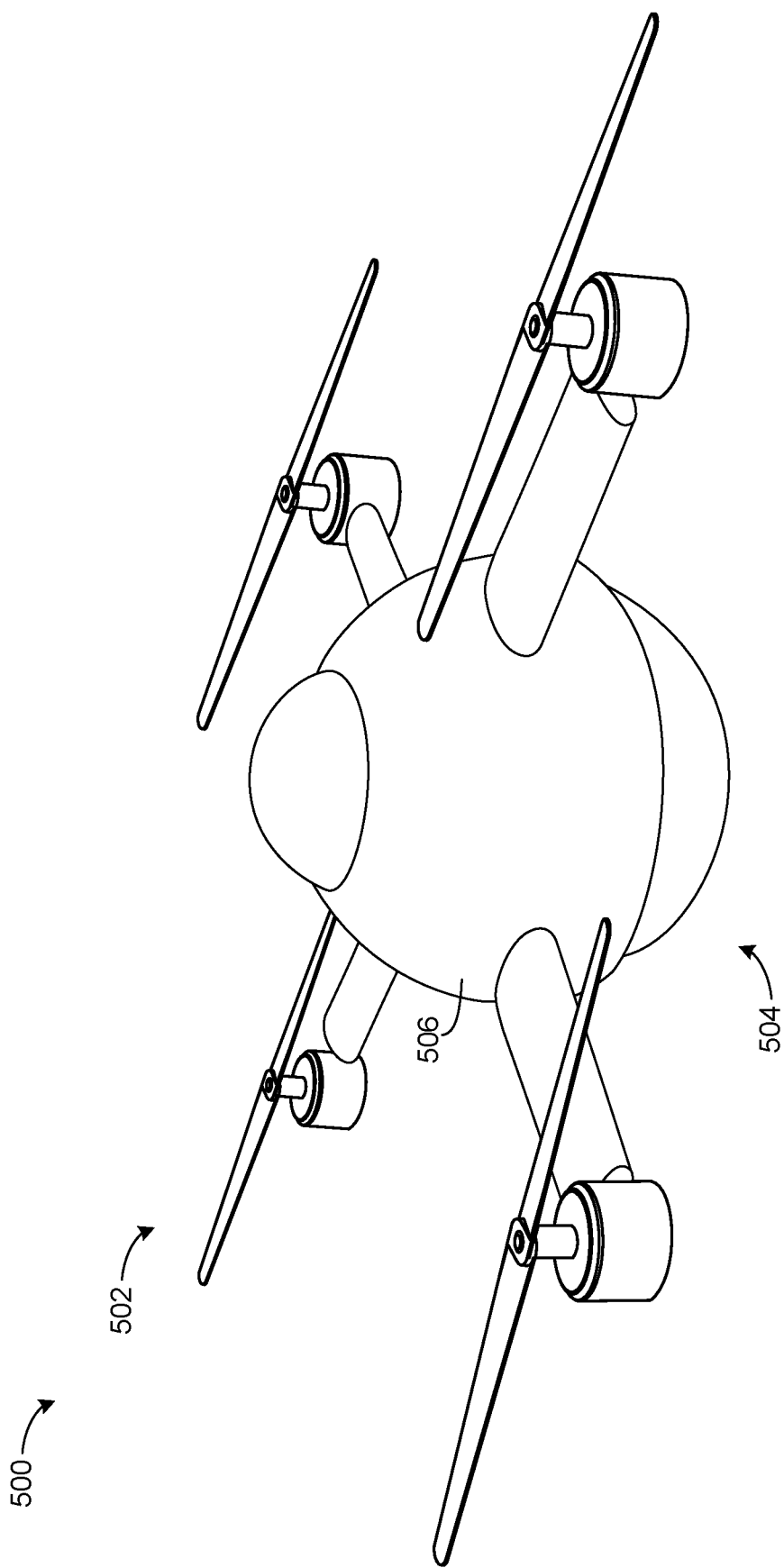
FIG. 5 is another example unmanned vehicle disclosed herein.

FIG. 5 illustrates another example unmanned vehicle 500 disclosed herein. Those components of the example unmanned vehicle 500 that are substantially similar or identical to the components of the example unmanned vehicle 100 described above with reference to FIGS. 1-4 will not be described in detail again below. Instead, the interested reader is referred to the above corresponding descriptions. To facilitate this process, similar reference numbers will be used for like structures.

Similar to the unmanned vehicle 100 of FIGS. 1-4, the unmanned vehicle 500 of the illustrated example is a hybrid unmanned vehicle having dual modes of operation that can operate in a first mode of operation (e.g., aerial mode) and the second mode of operation (e.g., terrestrial mode) different than the first mode of operation. The unmanned vehicle 500 of the illustrated example includes a propulsion system 502 and a roller system 504. The propulsion system 502 of the illustrated example is supported by a housing 506 and generates lift to operate the unmanned vehicle 500 and the first mode of operation (e.g., aerial locomotion). The roller system 504 of the illustrated example enables the housing 506 to rover on the ground via the propulsion system 502. The control system 200 (FIG. 2) may be used to implement the example unmanned vehicle 500. Unlike the housing 106 shown in FIGS. 1-4, the housing 506 of the illustrated example has a round or spherical shape or profile (e.g., an egg-shaped profile). The roller system 504 of the illustrated example includes a rollerball assembly 508 having a ball 120 at least partially protruding from the housing 506. Additionally, as described in greater detail in connection with FIGS. 6 and 7, the unmanned vehicle 500 of the illustrated example can be used to provide identification markings or characteristic(s).

Figure 6:
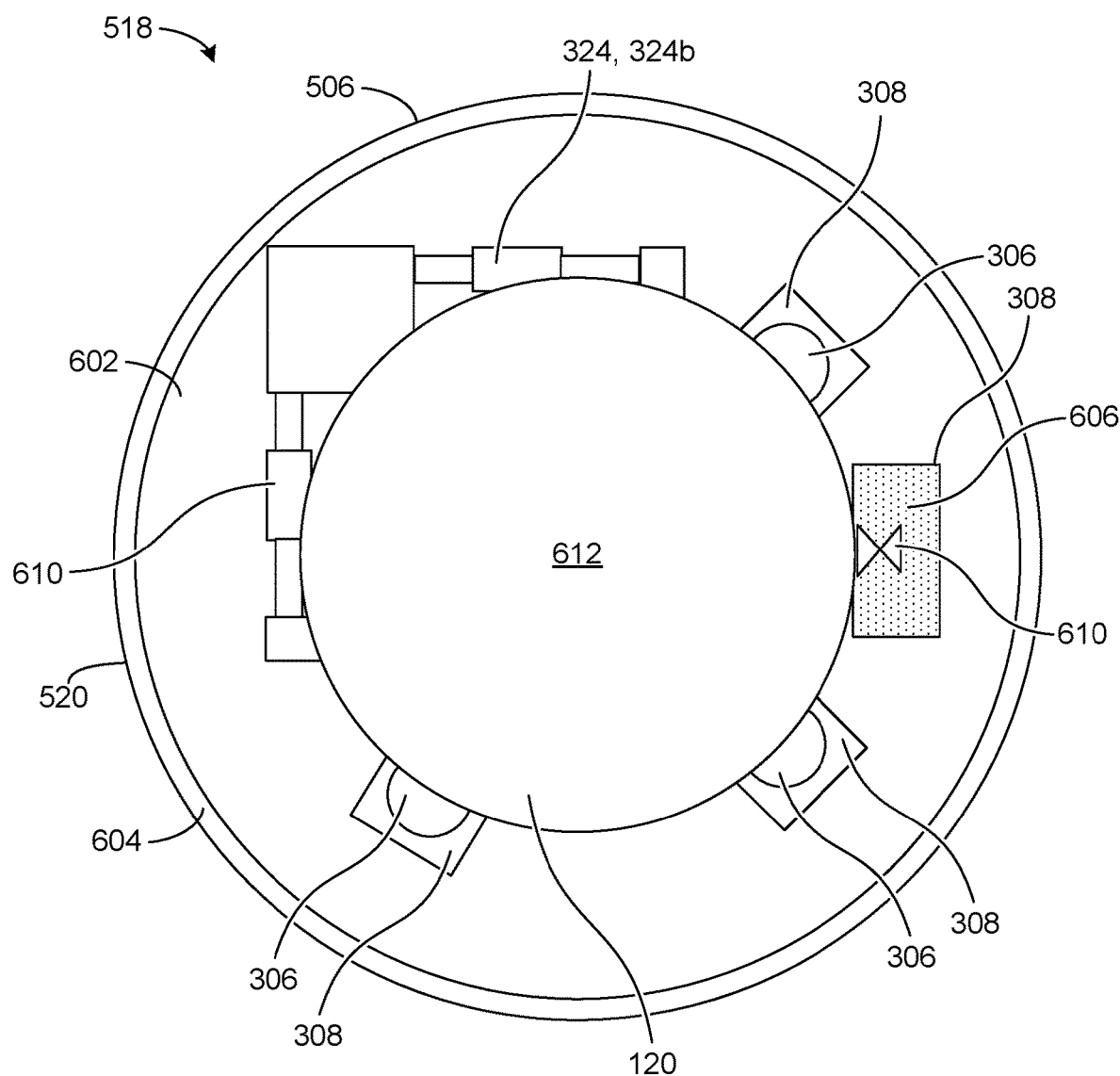
FIG. 6 is a bottom view of an example housing of the example unmanned vehicle of FIG. 5.

FIG. 6 is a partially assembled, front view of the example rollerball assembly 508 of FIG. 5. The rollerball assembly 508 of the illustrated example includes the ball 120, one or more bearings 306, one or more retainers 308, and one or more encoders 324 (e.g., a first encoder 324a and a second encoder 324b) that are positioned in a cavity 602 recessed relative a wall 604 (e.g., an outer perimeter wall) of the housing 506. To provide identification characteristic(s), the rollerball assembly 508 of the illustrated example includes a marking material 606 to be dispensed by the rollerball assembly 508. To retain the marking material 606, the rollerball assembly 508 of the illustrated example includes a container or reservoir 608 (e.g., a tank, a bladder). The reservoir 608 the illustrated example is positioned in the housing 506 adjacent the ball 120. In some examples, the reservoir 608 and the housing 506 are integrally formed as unitary structure. In some examples, the reservoir 608 provides means for containing the marking material 606.

To dispense the marking material 606 from the reservoir 608, the rollerball assembly 508 of the illustrated example includes a dispenser 610. The dispenser 610 of the illustrated example selectively dispenses the marking material 606 from the reservoir 608. For example, the dispenser 610 may be a valve that moves between an open position to allow fluid communication between the marking material 606 and an outer surface 612 of the ball 120, and a closed position to prevent fluid communication between the marking material 606 and the ball 120. In some examples, the dispenser 610 may be a solenoid valve that is actuated between the open position and the close position via the control system 200. In some examples, the dispenser 610 may have a spray nozzle that sprays the marking material 606 onto the outer surface 612 of the ball 120 as the ball 120 rotates relative to the housing 506 and/or the reservoir 608. In some examples, the dispenser 610 may include a sponge to be engaged by the ball 120 such that (e.g., after the sponge is saturated with the marking material 606) the sponge transfers or dispenses the marking material 606 onto the outer surface 612 of the ball 520. Thus, in some examples, the dispenser 610 provides means for selectively dispensing the marking material 606 onto an outer surface 612 of the ball 120.

Figure 7:
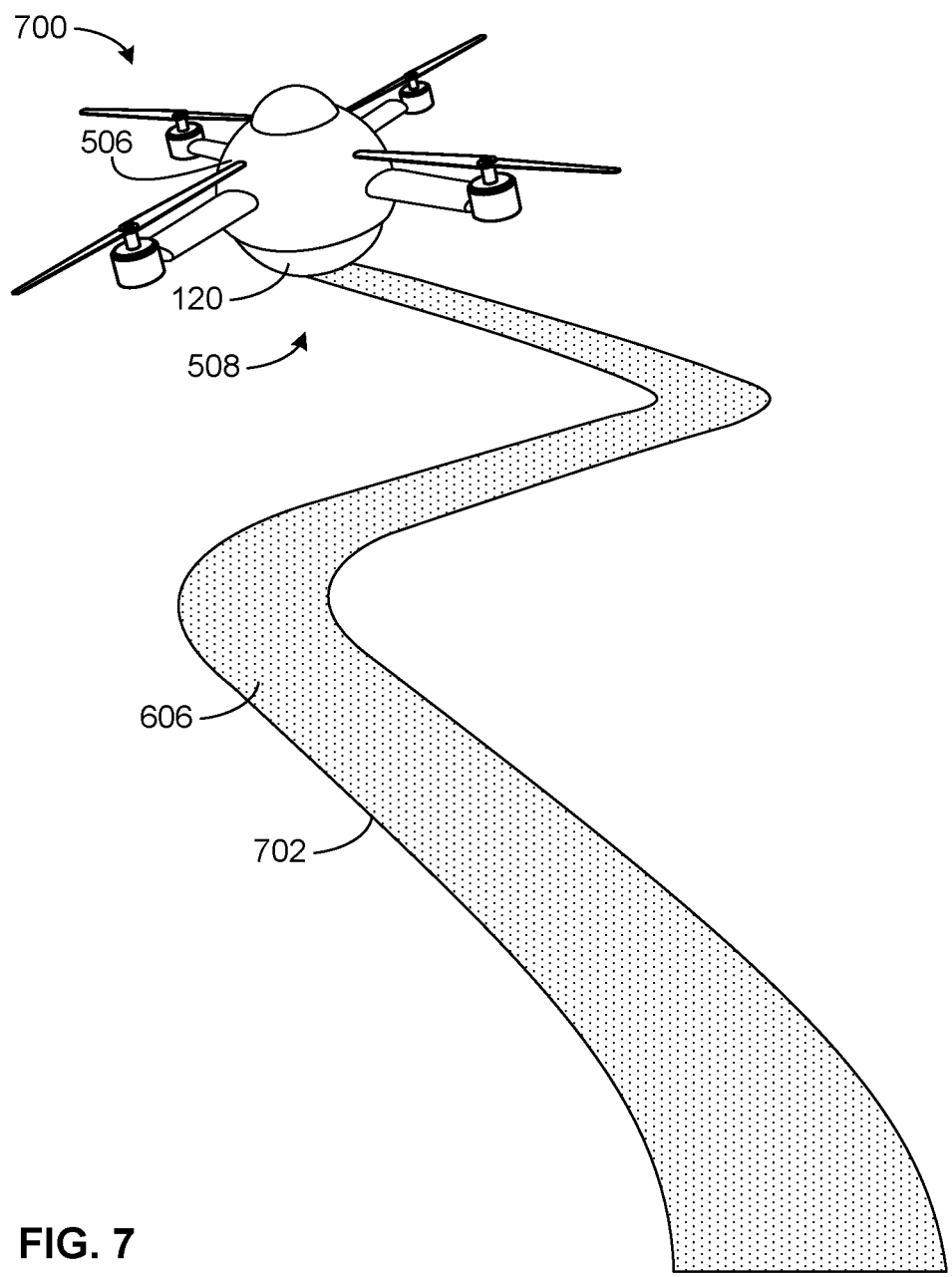
FIG. 7 is a perspective view of the example unmanned vehicle of FIGS. 5 and 6.

FIG. 7 illustrates the unmanned vehicle 500 of the illustrated example in the second mode of operation (e.g., terrestrial locomotion). In the second mode of operation, the rollerball assembly 508 of the illustrated example can dispense the marking material 606. In particular, the ball 120 receives the marking material 606 from the reservoir 608 (FIG. 6) via the dispenser 610. As the ball 120 rolls on the ground during terrestrial locomotion, the ball 120 transfers or ejects the marking material 606 on the ground. As shown in FIG. 7, the unmanned vehicle 500 of the illustrated example dispenses the marking material 606 along a track 702 defined by a path along which the unmanned vehicle 500 traverses during terrestrial locomotion. Thus, in some examples, the ball 120 provides means for applying marking material 606 on the ground or terrain during terrestrial locomotion. The marking material 606 of the illustrated example may be, for example, ink or other material(s) or substance(s) that can be visible under normal light, infrared light, ultraviolet light and/or may include any other marking material(s) or agent(s). The marking material 606 is a visible substance or agent that can be detected by other agents or unmanned vehicles using cameras (e.g., or another sensor(s)) if they are near a point of deposit (e.g., the track 702).

The marking material 606 may be a liquid, a powdery substance, a paste, a paint, a colored material(s), a dye, and/or any other material(s) that may be applied to the ball 120 of the unmanned vehicle 500. In some examples, the marking material 606 of the illustrated example may be a disappearing ink. Disappearing inks are inks that may be visible for a period of time without the intention of being made visible again. This kind of ink typically relies on the chemical reaction between thymolphthalein and a basic substance such as sodium hydroxide. Thymolphthalein, which is normally colorless, turns blue in solution with the base. As the base reacts with carbon dioxide (always present in the air), the pH drops below 10.5 and the color disappears. The "fading time" can be prolonged by adding (e.g., a small amount of) sodium hydroxide.

The marking material 606 can be used to indicate a path, a region, a landmark, and/or any other area that the unmanned vehicle 500 has visited during, for example, an exploration mission, a rescue mission and/or any other mission(s). In some examples, the marking material 606 may also indicate a direction of travel of the unmanned vehicle 500 (e.g., based on the disposition of the marking material 606 along the track 702). In some examples, the marking material 606 may be visible from the air above the track 702 (e.g., several hundred feet above the track 702). In some instances, the marking material 606 can be used as a landmark for relocalization, loop closure for localization, mapping, etc. In some examples, the marking material 606 can be used for calibration of visual odometry and localization sensors as they can be applied at precise regular intervals. Odometry, for example, is the use of data from motion sensors to estimate change in position over time. It is used in robotics by some legged or wheeled robots to estimate their position relative to a starting location. This method is sensitive to errors due to the integration of velocity measurements over time to give position estimates. Rapid and accurate data collection, instrument calibration, and processing are required in most cases for odometry to be used effectively.

In some examples, the marking material 606 may be used as an organizational tool for a plurality of communicatively coupled unmanned vehicles operating in collaboration to achieve a common goal (e.g., finding a target, finding the shortest path to a target, etc.). For example, the unmanned vehicle 500 of the illustrated example may be a master unmanned vehicle and a plurality of airborne unmanned vehicles may be slave unmanned vehicles that follow the marking material as a guide. For example, in some such examples, the marking material 606 may be a guide or path along which other unmanned vehicles may follow. Some such examples may allow efficient or smaller unmanned vehicles to search an area defined by the track 702 without the need of maps or localization methods which typically require high computing requirements. Thus, the unmanned vehicle 500 of the illustrated example may traverse a path during terrestrial locomotion to dispense marking material 606 to provide navigational guidance for smaller, less expensive airborne unmanned vehicles having small computing power and/or processors. The smaller unmanned vehicles may be equipped with sensors and/or cameras and may be monitor an area defined by the track 702.

Figure 8:
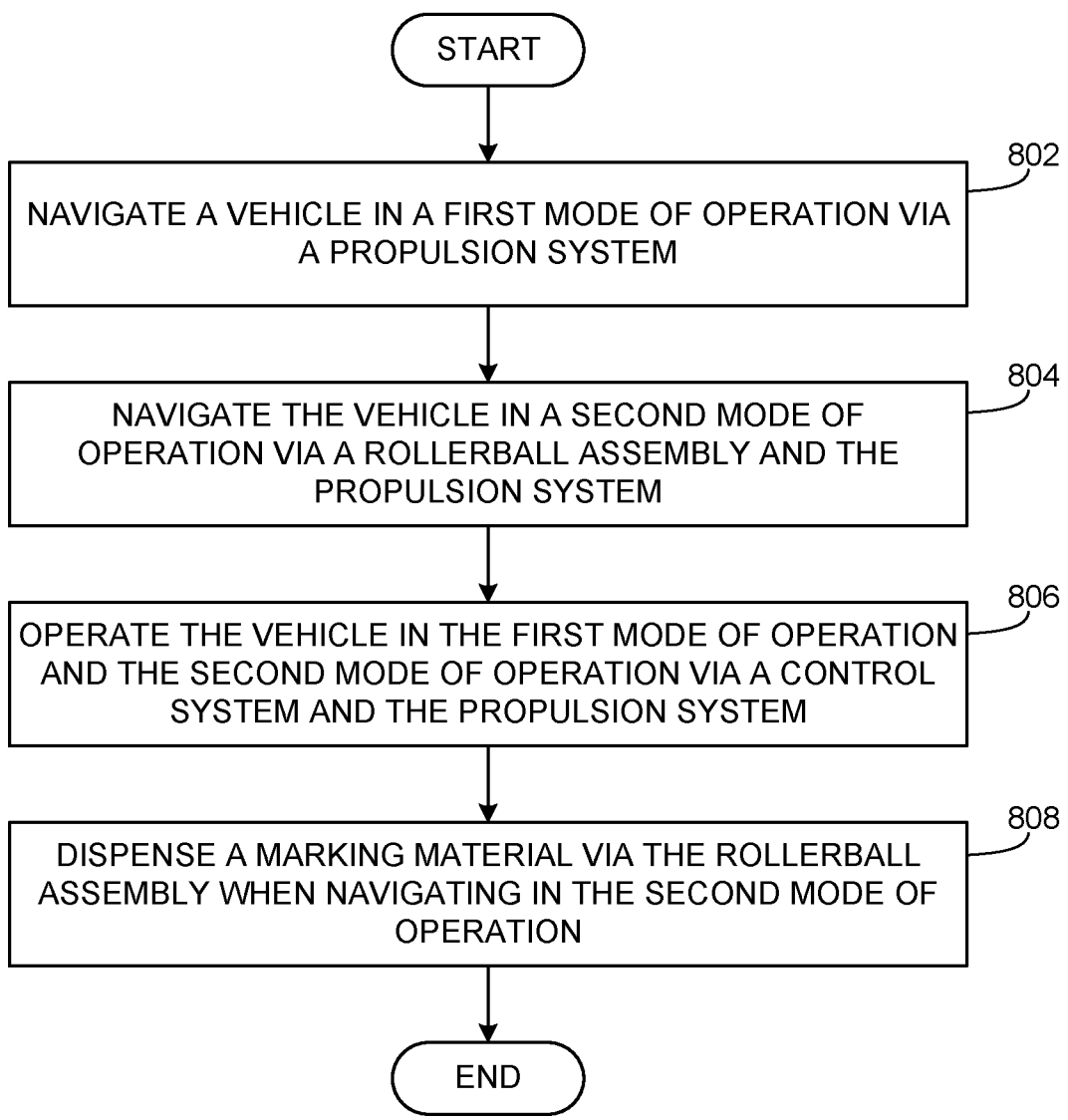
FIG. 8 is a flowchart of an example method of operating the example unmanned vehicles disclosed herein.

FIG. 8 is a flowchart of an example method 800 of operating the example unmanned vehicle 100, 500 disclosed herein. While an example manner of operating the example unmanned vehicle 100, 500 has been illustrated in FIG. 8, one or more of the steps and/or processes illustrated in FIG. 8 may be combined, divided, re-arranged, omitted, eliminated and/or implemented in any other way. Further still, the example method of FIG. 8 may include one or more processes and/or steps in addition to, or instead of, those illustrated in FIG. 8, and/or may include more than one of any or all of the illustrated processes and/or steps. Further, although the example method is described with reference to the flow chart illustrated in FIG. 8, many other methods of operating the unmanned vehicle 100, 500 may alternatively be used.

The example method of operating the unmanned vehicle 100, 500 begins at block 802 by navigating the unmanned vehicle 100, 500 in a first mode of operation via the propulsion system 108 (block 802). In the first mode of operation, the control system 200 may receive a command from a remote control operator and/or may receive a command from the trajectory controller 202 to maneuver or operate the unmanned vehicle 100, 500 via aerial locomotion or flight. The control system 200 operates the motors 116 (e.g., angular velocities of the motors 116) to generate lift (e.g., a thrust force greater than the weight of the unmanned vehicle 100, 500) to navigate the unmanned vehicle 100, 500 in aerial locomotion. In the first mode of operation, the propulsion system 108 is to enable three degrees of freedom in translational motion (e.g., the x-direction 402, the y-direction 404 and the z-direction 406), and three degrees of freedom in rotational motion (e.g., the yaw direction 408, the roll direction 410, and the pitch direction 412) when navigating the unmanned vehicle 100, 500 in the first mode of operation.

The method continues by navigating the unmanned vehicle 100, 500 in a second mode of operation via the rollerball assembly 118, 508 and the propulsion system 108 (block 804). In the second mode of operation, the control system 200 of the unmanned vehicle 100, 500 may receive a command from the remote control operator and/or may receive a command from the trajectory controller 202 to maneuver or operate the unmanned vehicle 100, 500 via terrestrial locomotion. The rollerball assembly 118, 508 is to enable two degrees of freedom in translational motion (e.g., the x-direction 402 and the y-direction 404) and three degrees of freedom in rotational motion (e.g., the yaw direction 408, the roll direction 410, and the pitch direction 412) when navigating the unmanned vehicle 100, 500 in the second mode of operation. For example, the rollerball assembly 118, 508 enables the unmanned vehicle 100, 500 can move in a sideways direction when navigating in the second mode of operation. Navigation in the first and the second modes of operation is implemented via the control system 200 and the propulsion system 108 (block 806). In some examples, a marking material 606 is dispensed from the rollerball assembly 508 when navigating the unmanned vehicle 500 in the second mode of operation (block 808).

Figure 9:
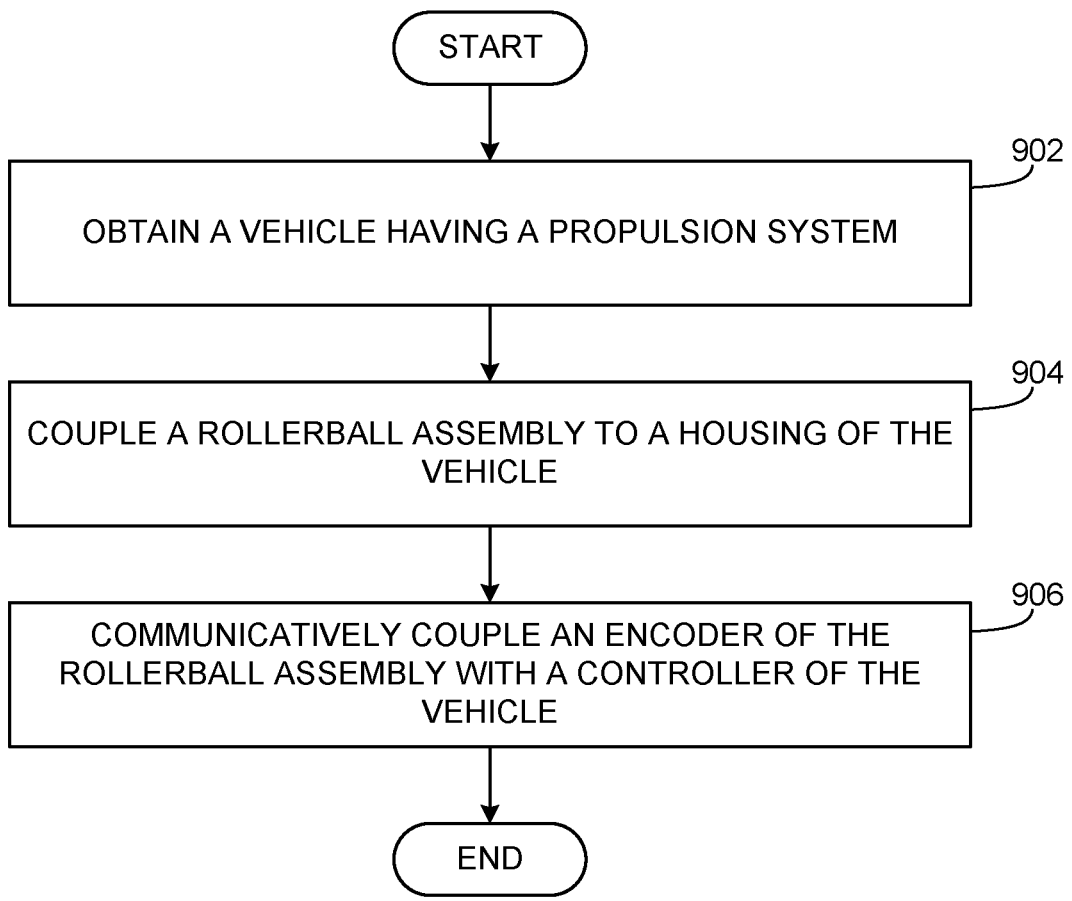
FIG. 9 is a flowchart of an example method to manufacture an example unmanned vehicle disclosed herein.

FIG. 9 is a flowchart of an example method 900 to manufacture an example unmanned vehicle 100, 500 disclosed herein. While an example manner of assembling the example unmanned vehicle 100, 500 has been illustrated in FIG. 9, one or more of the steps and/or processes illustrated in FIG. 9 may be combined, divided, re-arranged, omitted, eliminated and/or implemented in any other way. Further still, the example method of FIG. 9 may include one or more processes and/or steps in addition to, or instead of, those illustrated in FIG. 9, and/or may include more than one of any or all of the illustrated processes and/or steps. Further, although the example method is described with reference to the flow chart illustrated in FIG. 9, many other methods of assembling the unmanned vehicle 100, 500 may alternatively be used.

To begin the example assembly process of FIG. 9, a vehicle having a propulsion system is obtained (block 902). The vehicle may include a housing 106, 506 that is formed during assembly. In some examples, the housing 106, 506 is prefabricated or preassembled and/or may be an existing unmanned vehicle (e.g., an off the self-part, retrieved from a warehouse, etc.). A rollerball assembly 118, 508 is then attached to the housing 106, 506 (block 904). For example, the rollerball assembly 118, 508 may be fastened to the housing 106, 506 via fasteners. In some examples, the rollerball assembly 118, 508 may be retrofit to an existing unmanned vehicle. An encoder 324 of the rollerball assembly 118, 508 is communicatively coupled (e.g., via wires or wirelessly) to a control system of the unmanned vehicle 100, 500 (block 906).

Example unmanned vehicles are disclosed. Further examples and combinations thereof include the following.

Example 1 may be an unmanned vehicle including a housing and a rollerball rotatably coupled to the housing and a propulsion system supported by the housing. The propulsion system is to generate lift to enable the vehicle to navigate in a first mode of operation. The vehicle includes a rollerball rotatably coupled to the housing. The rollerball to enable the housing to navigate in a second mode of operation different than the first mode of operation. The propulsion system is to generate a drive force to enable the vehicle to navigate in the second mode of operation via the rollerball.

Example 2 includes the unmanned vehicle of example 1, wherein the rollerball rotates freely relative to the housing.

Example 3 includes the unmanned vehicle of any one of examples 1-2, wherein the rollerball to be at least partially exposed from a surface of the housing.

Example 4 includes the unmanned vehicle of any one of examples 1-3, wherein the rollerball includes a ball rotatably positioned in a carriage, the carriage to be removably coupled to the housing.

Example 5 includes the unmanned vehicle of any one of examples 1-4, wherein the carriage includes an encoder to track rotational movement of the ball relative to the carriage.

Example 6 includes the unmanned vehicle of any one of examples 1-5, wherein the encoder is communicatively coupled to a control system of the vehicle.

Example 7 includes the unmanned vehicle of any one of examples 1-6, further including a controller to maneuver the vehicle in the first mode of operation and the second mode of operation.

Example 8 includes the unmanned vehicle of any one of examples 1-7, wherein the controller employs the same control law to maneuver the vehicle in the first mode of operation and the second mode of operation.

Example 9 includes the unmanned vehicle of any one of examples 1-8, wherein, in the first mode of operation, the vehicle is capable of translational motion in a x-direction, y-direction and z-direction and rotational motion in a yaw-direction, a roll-direction, and a pitch-direction.

Example 10 includes the unmanned vehicle of any one of examples 1-9, wherein, in the second mode of operation, the vehicle is capable of translational motion in a x-direction and a y-direction, and rotational motion in a yaw-direction, a roll-direction, and a pitch-direction.

Example 11 includes the unmanned vehicle of any one of examples 1-10, further including a marking material to be dispensed by the rollerball when the vehicle is in the second mode of operation.

Example 12 includes the unmanned vehicle of any one of examples 1-11, wherein the marking material is invisible ink.

Example 13 includes the unmanned vehicle of any one of examples 1-12, wherein the rollerball is a spherical ball composed of at least one of a hard plastic or a rubber material.

Example 14 may be a method of assembling a hybrid unmanned vehicle including obtaining a housing having a propulsion system that generates lift to navigate the vehicle in an aerial mode of operation; and coupling a rollerball assembly to the housing, the rollerball assembly to enable the vehicle to navigate in a terrestrial mode of operation via the propulsion system.

Example 15 includes the method of example 14, further including communicatively coupling an encoder of the rollerball assembly to a controller of the vehicle.

Example 16 includes the method of any one of examples 14-15, further including attaching a carriage of the rollerball assembly to the housing.

Example 17 includes the unmanned vehicle of any one of examples 14-16, further including positioning a ball of the rollerball assembly to at least partially protrude from the carriage when the carriage is coupled to the housing.

Example 18 may be an unmanned vehicle including a housing; means for generating lift to enable aerial locomotion in a first mode of operation, the lift means supported by the housing; means for rolling to enable terrestrial locomotion in a second mode of operation, the rolling means to be driven via the lift generating means.

Example 19 includes the unmanned vehicle of example 19, further including means for marking to be dispensed by the vehicle when operating in the second mode of operation.

Example 20 includes the unmanned vehicle of any one of examples 18-19, further including means for retaining the marking means in the housing.

Example 21 includes the unmanned vehicle of any one of examples 18-20, further including means for selectively dispensing the marking means from the retaining means.

Example 22 includes the unmanned vehicle of any one of examples 18-21, further including means for tracking a translational motion of the vehicle in the second mode of operation when the rolling means rotates relative to the housing.

Example 23 includes the unmanned vehicle of any one of examples 18-22, further including means for controlling the lift generating means to enable navigation of the vehicle in the first mode of operation and the second mode of operation.

Example 24 is an example method of operating an unmanned vehicle including navigating the vehicle in a first mode of operation via a propulsion system, the propulsion system to generate lift to enable three degrees of freedom in translational motion and three degrees of freedom in rotational motion when navigating the vehicle in the first mode of operation; and navigating the vehicle in a second mode of operation via a rollerball assembly and the propulsion system, the rollerball assembly and the propulsion system to enable two degrees of freedom in translational motion and three degrees of freedom in rotational motion when navigating the vehicle in the second mode of operation.

Example 25 includes the method of example 24, further including moving the vehicle in a sideways direction when navigating the vehicle in the second mode of operation.

Example 26 includes the method of any one of examples 24-25, further including dispensing a marking material via the rollerball assembly when navigating the vehicle in the second mode of operation.

Example 27 includes the method of any one of examples 24-26, further including operating the vehicle in the first mode of operation and the second mode of operation via a control system and the propulsion system.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A hybrid unmanned vehicle comprising:
    a housing;
    a propulsion system supported by the housing, the propulsion system to generate lift to enable the vehicle to navigate in a first mode of operation; and
    a rollerball rotatably and centrally coupled to the housing, the rollerball to enable the housing to navigate in a second mode of operation different than the first mode of operation, the propulsion system to generate a drive force to enable the vehicle to navigate in the second mode of operation via the rollerball.

2. The vehicle of claim 1, wherein the rollerball rotates freely relative to the housing.

3. The vehicle of claim 1, wherein the rollerball is to be at least partially exposed from a surface of the housing.

4. The vehicle of claim 1, wherein the rollerball includes a ball rotatably positioned in a carriage, the carriage to be removably coupled to the housing.

5. The vehicle of claim 4, wherein the carriage includes an encoder to track rotational movement of the ball relative to the carriage, wherein the encoder is communicatively coupled to a control system of the vehicle.

6. The vehicle of claim 1, further including a controller to maneuver the vehicle in the first mode of operation and the second mode of operation, wherein the controller is to employ the same control law to maneuver the vehicle in the first mode of operation and the second mode of operation.

7. The vehicle of claim 1, wherein in the first mode of operation, the vehicle is capable of translational motion in a x-direction, y-direction and z-direction and rotational motion in a yaw-direction, a roll-direction, and a pitch-direction, and wherein in the second mode of operation, the vehicle is capable of translational motion in a x-direction and a y-direction, and rotational motion in a yaw-direction, a roll-direction, and a pitch-direction.

8. The vehicle of claim 1, further including a marking material to be dispensed by the rollerball when the vehicle is in the second mode of operation.

9. The vehicle of claim 8, wherein the marking material is invisible ink.

10. The vehicle of claim 1, wherein the rollerball is a spherical ball composed of at least one of a hard plastic or a rubber material.

11. A method of assembling a hybrid unmanned vehicle, the method comprising:
    obtaining a housing having a propulsion system that generates lift to navigate the vehicle in an aerial mode of operation; and
    coupling a rollerball assembly to the housing, the rollerball assembly including a rollerball located centrally relative to the housing, the rollerball assembly to enable the vehicle to navigate in a terrestrial mode of operation via the propulsion system.

12. The method of claim 11, further including communicatively coupling an encoder of the rollerball assembly to a controller of the vehicle.

13. The method of claim 11, further including attaching a carriage of the rollerball assembly to the housing.

14. The method of claim 13, further including positioning the rollerball of the rollerball assembly to at least partially protrude from the carriage when the carriage is coupled to the housing.

15. An unmanned vehicle comprising:
    a housing;
    means for generating lift to enable aerial locomotion in a first mode of operation, the lift means supported by the housing;
    means for rolling to enable terrestrial locomotion in a second mode of operation, the rolling means to be driven via the lift generating means; and
    means for controlling the lift generating means to enable navigation of the vehicle in the first mode of operation and the second mode of operation.

16. The vehicle of claim 15, further including means for marking to be dispensed by the vehicle when operating in the second mode of operation.

17. The vehicle of claim 16, further including means for retaining the marking means in the housing.

18. The vehicle of claim 15, further including means for selectively dispensing the marking means from the retaining means.

19. The vehicle of claim 15, further including means for tracking a translational motion of the vehicle in the second mode of operation when the rolling means rotates relative to the housing.

20. The vehicle of claim 15, further including means for controlling the lift generating means to enable navigation of the vehicle in the first mode of operation and the second mode of operation.

* * * * *